US008837045B2

(12) United States Patent
Popescu et al.

(10) Patent No.: US 8,837,045 B2
(45) Date of Patent: Sep. 16, 2014

(54) DIFFRACTION PHASE MICROSCOPY WITH WHITE LIGHT

(71) Applicant: The Board of Trustees of the University of Illinois, Urbana, IL (US)

(72) Inventors: Gabriel Popescu, Champaign, IL (US); Basanta Bhaduri, Champaign, IL (US); Hoa Pham, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/776,232

(22) Filed: Feb. 25, 2013

(65) Prior Publication Data
US 2014/0085715 A1    Mar. 27, 2014

Related U.S. Application Data

(60) Provisional application No. 61/704,005, filed on Sep. 21, 2012.

(51) Int. Cl.
*G02B 21/06* (2006.01)
*G02B 21/36* (2006.01)

(52) U.S. Cl.
CPC ..................... *G02B 21/36* (2013.01)
USPC ....................................................... 359/385

(58) Field of Classification Search
USPC ......... 359/385–390, 362, 368, 558–563, 566, 359/237
See application file for complete search history.

(56) References Cited

U.S. PATENT DOCUMENTS

| | | | | |
|---|---|---|---|---|
| 2005/0057749 | A1* | 3/2005 | Dietz et al. | 356/318 |
| 2007/0046946 | A1* | 3/2007 | Namiki | 356/456 |
| 2007/0109547 | A1* | 5/2007 | Jungwirth | 356/450 |
| 2009/0135432 | A1* | 5/2009 | Betzig | 356/521 |
| 2010/0025567 | A1* | 2/2010 | Lueerssen | 250/205 |

* cited by examiner

*Primary Examiner* — William Choi
*Assistant Examiner* — Sharrief Broome
(74) *Attorney, Agent, or Firm* — Sunstein Kann Murphy & Timbers LLP

(57) ABSTRACT

A microscope and methods for obtaining a phase image of a substantially transparent specimen. Light collected from a specimen illuminated by a temporally incoherent source is diffracted into a first order and either the zeroth or first order is low-pass filtered in a Fourier transform plane before the orders are recombined at a focal plane detector. By low pass filtering the first order diffracted beam into a plurality of wavelengths, a spectrally- and spatially-resolved quantitative phase image of the specimen is obtained.

12 Claims, 6 Drawing Sheets
(6 of 6 Drawing Sheet(s) Filed in Color)

DIFFRACTION PHASE MICROSCOPY WITH WHITE LIGHT

This application claims priority from U.S. Provisional Patent Application Ser. No. 61/704,005, filed Sep. 21, 2012, and incorporated herein by reference.

This invention was made with government support under Grants CBET 08-46660 and CBET 1040462, both awarded by the National Science Foundation, and Grant R21 CA147967-01, awarded by the National Cancer Institute. The Government has certain rights in the invention.

TECHNICAL FIELD

The present invention relates to methods of quantitative phase imaging, and, more particularly, to quantitative phase imaging using spatially coherent white light illumination of substantially transparent specimens.

BACKGROUND ART

Quantitative phase imaging (QPI) is described in detail in Popescu, *Quantitative phase imaging of cells and tissues*, (McGraw-Hill, 2011), incorporated herein by reference. In QPI, the optical path length associated with substantially transparent specimens is measured and mapped, and translated into biomedically relevant information. The main figures of merit in QPI are:

1) acquisition rate;
2) transverse resolution;
3) temporal phase sensitivity; and
4) spatial phase sensitivity.

Off-axis phase imaging methods have provided the fastest acquisition rates by virtue of the fact that phase information, and thus optical path lengths, are extracted from a single recorded interferogram, as described, for example in Ikeda et al., Hilbert phase microscopy for investigating fast dynamics in transparent systems, *Opt. Lett.*, vol. 30, pp. 1165-67 (2005), hereinafter "Ikeda (2005)," incorporated herein by reference. Diffraction-limited transverse resolution, on the other hand, is intrinsically preserved in phase shifting methods, whereas off-axis techniques may degrade transverse resolution. The highest temporal phase sensitivity (that is, the smallest frame-to-frame phase shift) is provided by common-path methods because they are the most stable. Finally, the highest spatial phase sensitivity (i.e., the smallest point-to-point phase change within the same frame) is obtained in the absence of speckles, which implies an incoherence—in at least some respect—of the source of illumination.

Diffraction phase microscopy (DPM), as described in Popescu et al., Diffraction phase microscopy for quantifying cell structure and dynamics, *Opt. Lett.*, vol. 31, pp. 775-77 (2006), incorporated herein by reference, is both off-axis and common-path, and thus combines the benefits of fast acquisition rates and high temporal sensitivity. These features enabled DPM to perform unprecedented biological studies, especially related to red blood cell membrane dynamics. In diffraction phase microscopy, a sample is illuminated with monochromatic light such as the second harmonic of a Nd:YAG laser, for example. A phase grating is placed at the image plane (IP) of an inverted microscope where the microscope provides a magnified image of the sample. The $0^{th}$-order beam is low-pass filtered by a spatial filter in the Fourier plane of a Fourier lens, while the first order beam is allowed to pass unfiltered. The low-pass filtered (and, thus, essentially uniform) $0^{th}$-order beam and the first-order beam are recombined and interfered at a detector focal plane at a small angle with respect to the normal to the microscope output image plane, such that intensity at the detector contains a cross term dominated by the cosine of the optical phase. Further details may be found in Popescu (2006). Due to the laser illumination, however, images of DPM, as practiced, suffer from speckles, which ultimately degrade the spatial phase sensitivity and limit the applicability for studying subcellular structures.

Spatial light interference microscopy (SLIM), described, for example, in US Published Patent Application 2009/0290156 (to Popescu et al.) and by Wang et al., Spatial Light Interference Microscopy (SLIM), *Opt. Exp.*, vol. 19, pp. 1016-26 (2011), both of which are incorporated herein by reference, removes the obstacle of speckle by using white light in a phase-shifting geometry. However, SLIM requires the acquisition of a series of four intensity images to derive a single quantitative phase image.

A subsequent quantitative phase imaging modality, introduced by Ding et al., Instantaneous spatial light interference microscopy, *Optics Exp.*, vol. 18, pp. 1569-75 (2010), incorporated herein by reference, places a phase contrast condenser annulus in the illuminating beam and a diffraction grating at the image plane (IP) of an inverted microscope, generating distinct diffraction orders. The $0^{th}$ order is spatially low-pass filtered to match the image of the condenser annulus, passing the DC component of the $0^{th}$ order to serve as a reference beam which is interfered with the first order, without the spatial offset that characterizes DPM, in order to derive a spectrally resolved phase image. iSLIM requires a condenser annulus at the expense of illumination available at higher spatial frequencies of the diffracted component, thereby reducing the signal-to-noise in the phase image. Furthermore, the iSLIM system requires a spatial light modulator (KM) for filtering the unscattered light which makes the iSLIM setup more complicated.

It would thus be desirable to obtain the benefit of speckle-free quantitative phase imaging, but to do so in a single exposure.

SUMMARY OF EMBODIMENTS OF THE INVENTION

In accordance with embodiments of the invention, a diffraction phase microscope is provided. The diffraction phase microscope has a temporally incoherent source of an illuminating beam for illuminating a specimen, an objective lens for collecting light from the source transmitted through the specimen and forming an image at an output port, and a grating for relaying a zeroth order beam and for diffracting the image into a first-order diffracted beam. A first Fourier lens is provided for transforming the zeroth-order beam and first-order diffracted beam into respective Fourier transform fields in a Fourier transform plane, while a Fourier transform space mask low-pass filters one of the zeroth-order beam and the first-order beam in the Fourier transform plane. Finally, the diffraction phase microscope has a second Fourier lens for recombining the zeroth-order beam and first-order diffracted beam at a focal plane detector.

In accordance with alternate embodiments of the invention, the diffraction phase microscope may also have a condenser aperture disposed between the temporally incoherent source and the specimen for creating a substantially spatially coherent illumination beam in a sample plane. The Fourier transform space mask may be implemented by a spatial light modulator, and the grating may be a transmission grating. The Fourier transform space mask may include a pinhole for transmitting the zeroth-order beam as a reference beam, or may include a plurality of pinholes for transmitting the first-order beam as a reference beam specific to a spectral range.

In accordance with another aspect of the present invention, a method is provided for obtaining a phase image of a substantially transparent specimen. The method has steps of:

a. illuminating the specimen with substantially temporally incoherent light;
b. forming a transmission image of the specimen in an image plane;
c. dispersing the transmission image into a zeroth- and first-order beams;
d. low-pass filtering one of the zeroth-order and the first-order beam in a Fourier plane;
e. interfering the zeroth- and first-order beams at a focal plane detector; and
f. retrieving a spatially resolved quantitative phase image of the specimen.

In further embodiments, the first-order beam may be filtered by means of a plurality of pinholes for selecting a reference beam at wavelengths characterizing a specified spectral range. The step of retrieving a spatially resolved quantitative phase image may be performed by applying a spatial Hilbert transform, or by applying local derivatives of an interferogram obtained at the focal plane detector.

In yet further embodiments of the present invention, the step of forming the transmission image may include illuminating the phase object with substantially spatially coherent illumination, or with illumination that is substantially incoherent.

BRIEF DESCRIPTION OF THE DRAWINGS

The present patent or application file contains at least one drawing executed in color. Copies of this patent with color drawing(s) will be provided by the Patent and Trademark Office upon request and payment of necessary fee.

The foregoing features of the invention will be more readily understood by reference to the following detailed description, taken with reference to the accompanying drawings, in which:

FIGS. 1B and 1C show details of a Fourier transform space mask for spectrally unresolved and spectrally resolved diffraction phase microscopy, respectively.

FIG. 2A shows a noise distribution in a single frame, varying over a range of [−4, 4] μm, while

FIG. 2C shows the spatiotemporal power spectral density in a log scale at $k_y=0$, while

FIG. 3A is an reconstructed wDPM phase image of a 2.9±0.14 μm polystyrene microbead obtained using methods in accordance with the present invention while

FIG. 5A is an original wDPM image of red blood cells, while FIG. 5B is a reconstructed quantitative phase map after subtracting the background phase, employing the steps described in the text, below. Color bars show the phase in radian. k=1.8285 rad/pixel.

FIG. 6A shows cells imaged in prior art bright field illumination, while

DETAILED DESCRIPTION OF EMBODIMENTS OF THE INVENTION

Definitions: The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

As used herein, "label-free" refers to a method of imaging a substantially transparent sample that does not require introduction of materials, such as fluorophores or contrast agents that are extrinsic to the imaged sample.

The terms "object," "sample," and "specimen" shall refer, interchangeably, to a tangible, non-transitory physical object capable of being rendered as an image.

The term "temporally incoherent" as applied to a source of irradiation shall refer to a source characterized by a coherence time $\tau_c$ that is no longer than 10 cycles of a central frequency of the light emitted by the source.

The term "substantially high spatial coherence" as applied to a beam of light shall denote a condition of coherence wherein if two slits were to be placed within the a coherence area exceeding the field of view in a plane transverse to the beam propagation axis, at least one interference null would result in the far field where the intensity is no greater than 10% of the peak intensity of the beam.

In accordance with embodiments of the present invention, novel apparatus and methods are provided to enable single shot images with high spatial and temporal sensitivity. Such methods may be referred to herein as "white-light DPM," or "wDPM". Further description may be found in Bhaduri et al., Diffraction phase microscopy with white light, *Opt. Lett.*, vol. 37, pp. 1094-96 (2012), incorporated herein by reference. Certain embodiments of the present invention measure quantitative phase delays at several wavelengths, these methods referred to herein as "spectroscopic diffraction phase microscopy," or "sDPM," as further described in Pham et al., Spectroscopic Diffraction Phase Microscopy," *Opt. Lett.*, vol. 37, pp. 3438-40 (2012), also incorporated herein by reference.

Figure 1A:
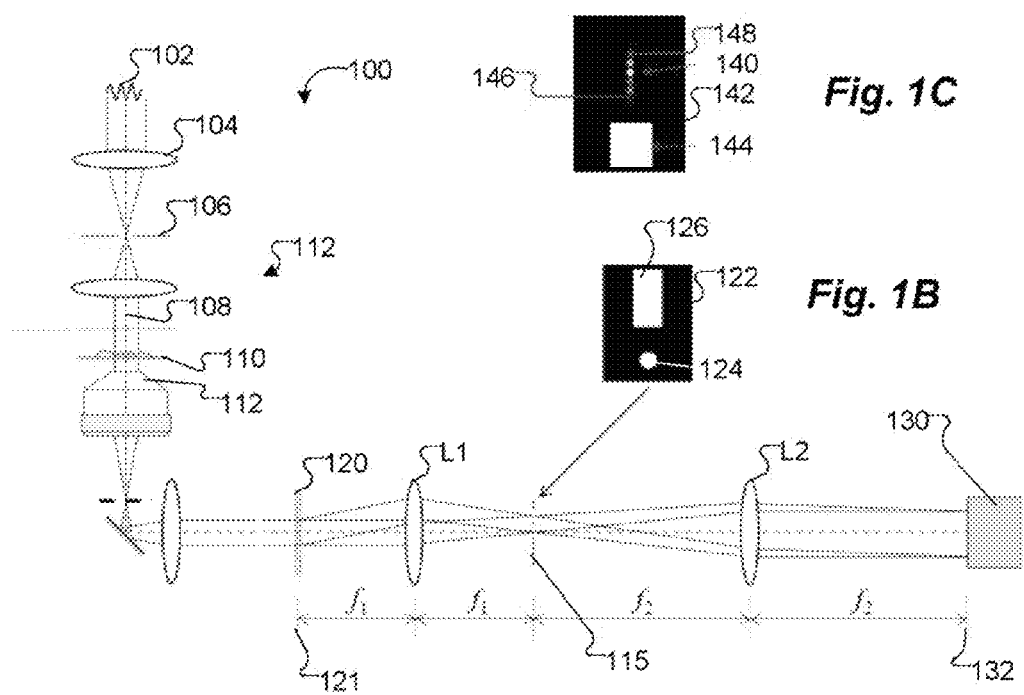
FIG. 1A is a general schematic depiction of a white light diffraction phase microscope in accordance with an embodiment of the present invention.

Embodiments of the invention are first described with reference to FIG. 1A, where a white light diffraction phase microscope is designated generally by numeral 100. In some embodiment of the present invention, wDPM and sDPM may be implemented in the form of an add-on module used in conjunction with a commercial microscope, such as an Axio Observer Z1 model, available from Carl Zeiss, Inc. Advantageously, practice in accordance with the present invention does not require specialized phase contrast optics as might be the case in other imaging modalities such as instantaneous spatial light interference microscopy (iSLIM), mentioned above.

Spatially coherent white light illumination is provided by a temporally incoherent (broadband) illumination source 102, which may be a halogen lamp, for example, via collector lens 104. The temporal incoherence of illumination source 102 requires that it not be a laser or other coherent source. A condenser aperture 106 is stopped down (to a numerical aperture of NA=0.09, in a preferred embodiment) such that light field 108 is substantially spatially coherent over the entire field of view. Illumination power at sample plane 110 for this NA is typically 0.16 mW, whereas for a fully open condenser (NA=0.55), it is 5.57 mW. It is to be understood, however, that the condenser may have any aperture, and, indeed, may be fully open, within the scope of the present invention. A fully open condenser (incoherent illumination) provides only qualitative phase information, but still serves to increase the contrast of a transparent specimen.

As in DPM, an amplitude diffraction grating 120 (or any equivalent diffractive element), typically a transmission grating, is disposed at the image plane of the inverted microscope (or, equivalently, "microscopic imaging system"), designated generally by numeral 112, thereby generating multiple diffraction orders containing full spatial information about the image. The $0^{th}$- and $1^{st}$-order beams are isolated at the Fourier plane 115 generated by lens L1 using a Fourier transform space mask 122, which may be implemented by a spatial light modulator (SLM), for example.

In an embodiment described with reference to FIG. 1B, the $0^{th}$—order beam is spatially low-pass filtered by Fourier transform space mask 122 such that only the DC component of the $0^{th}$ order is passed, whereas the first order is completely passed. The diameter of the pinhole 124 (constituting the zero-order mask) at Fourier plane 115 is of the order of 200 µm, in one embodiment, whereas a rectangular opening 126 (first-order mask) has a size of 5×2 mm². The lens system comprised by lenses L1 and L2 forms a highly stable Mach-Zehnder interferometer (with the path of the $1^{st}$—order beam comprising the longer interferometer arm, and the path of the $0^{th}$—order beam comprising the shorter arm, in the "white" light embodiments associated with mask 122 of FIG. 1B). The $1^{st}$ order is thus the imaging field and the 0th order plays the role of the reference field. Both beams are interfered and generate a spatially modulated interference image, which is captured by a CCD camera 130 at image plane 132.

The common-path geometry substantially matches the optical path lengths for the sample and reference arms such that the alignment is independent of the wavelength and temporal coherence of illumination source 102. The spatially resolved quantitative phase image associated with the sample is retrieved from a single CCD recording via a spatial Hilbert transform, as described in Ikeda (2005).

In other embodiments of the invention, described now with reference to FIG. 1C, mask 142 (which may be implemented as an SLM, for example) may also be configured to select different wavelengths in Fourier plane 115 by virtue of a plurality of pinholes designated generally by numeral 140. Light diffracted in the first order and passing through pinholes 140 is referred to as the "filtered" first order, and is used as a plurality of reference beams (one in each spectral range) of an interferometer. Spectral ranges may be spaced to interrogate pertinent experimental data, from shorter wavelengths at pinhole 146 to longer wavelengths, at pinhole 148, which may cover blue and red ranges respectively, for example. Zeroth order light, passing through aperture 144, plays the role of the imaging field, in these embodiments of the invention.

The spectrum of the first order at each pinhole position is measured using Ocean Optics USB2000+ Fiber Optic Spectrometer. The mean wavelength of each spectrum is then used to calculate the expected phase shift corresponding to each pinhole position.

The phase shift measured by the system is related to the refractive index and thickness of the sample as:

$$\Delta\phi(x,y;\lambda)=k_0\Delta n(\lambda)h(x,y) \quad (1)$$

where $k_0=2\pi/\lambda$ and $\lambda$ is the mean wavelength, h is the thickness and $\Delta n(\lambda)$ is the difference between the refractive index of the sample and that of the surrounding media. The phase shift couples the refractive index and the thickness of the sample. Since we can measure the phase shift at multiple wavelengths using sDPM, the measured phase shifts at two different wavelengths can be used to decouple the refractive index and the thickness.

For purposes of the current discussion, live cells may be assumed to behave as phase objects due to their thin transparent nature. This is a valid approximation as, for unstained cells, bright field images show little to no contrast in intensity. The period of grating 120 (9 µm in some embodiments of the invention) is set to be smaller than the diffraction-limited spot of the microscopic imaging system 112 at grating plane 121.

It is preferred that all lenses of white light diffraction phase microscope 100 be achromatic so as to minimize chromatic dispersion. In an experimental embodiment of the invention, microscope 112 was equipped with a bright-field 40×(0.75 NA) objective 112. The L1-L2 lens system gives an additional magnification of $f_2/f_1=2.5$, where $f_1$ and $f_2$ are the focal lengths of L1 and L2 respectively, such that the sinusoidal modulation of the image is sampled by 6 CCD pixels per period.

In order to characterize the noise stability of an experimental embodiment of the present invention, the phase of a time-series of 256 background images $\phi(x,y,t)$ of size 512×512 (or 18.5×18.5 µm²) was measured, and the phase of a single background image $\phi_0(x,y)$ of the same size was measured at a different spatial position. Background phase subtraction allows correction for any wavefront curvature, which is a constant associated with a particular instrument.

Figure 2A:
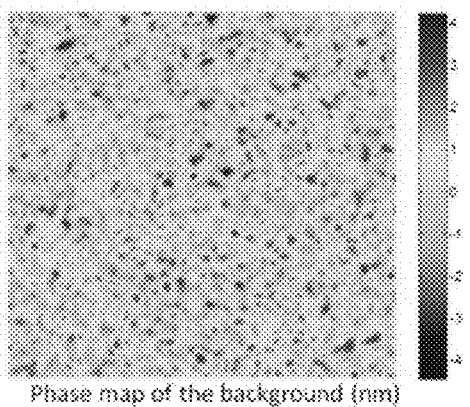

The spatio-temporal phase noise distribution is then calculated as $$\delta\phi(x,y,t)=\phi(x,y,t)-\phi_0(x,y) \quad (2)$$

and is shown in FIG. 2A at one chosen instant of time.

Figure 2B:
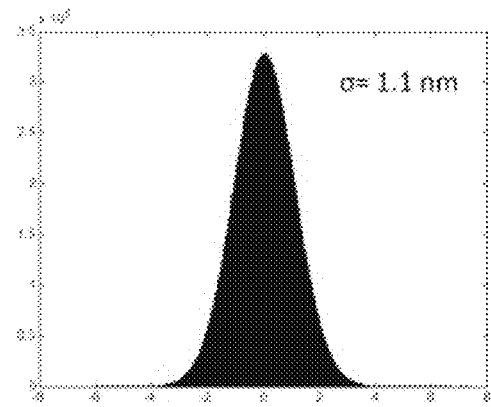
FIG. 2B shows a noise histogram of the data in FIG. 2A.

FIG. 2B shows a noise histogram considering the entire recording time, i.e., the histogram of all $\delta\phi$ values. This histogram has a standard deviation of $\sigma=1.1$ nm, which represents the overall spatiotemporal noise of the system.

Figure 2C:
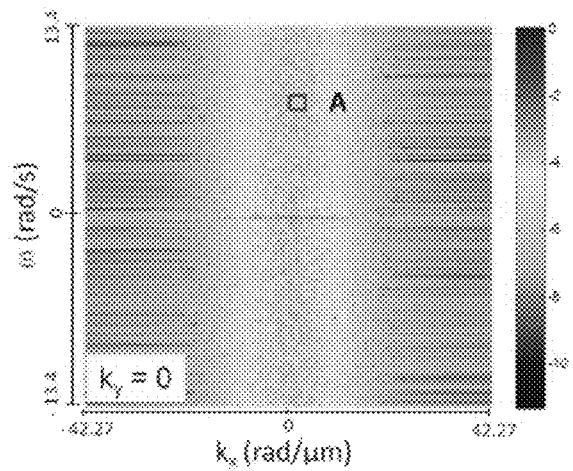
Figure 2D:
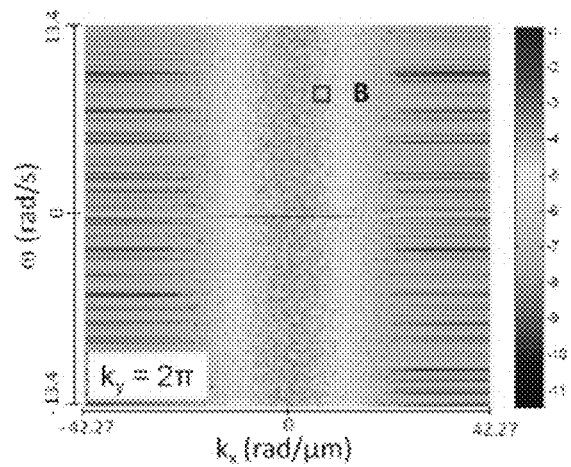
FIG. 2D shows the spatiotemporal power spectral density in a log scale at $k_y=2\pi$.

A more complete characterization of the spatiotemporal noise may be obtained by numerically computing the spatial and temporal power spectrum as described in Chap. 8 of Popescu (2011). The spatial and temporal power spectrum is given by:

$$\phi(k,\omega)=\alpha|\iint_A\int_{-\infty}^{\infty}\delta\phi(r,t)e^{-i(\omega t-k\cdot r)}dcd^2r|^2 \quad (3)$$

where $\alpha$ is a normalization factor, such that the area under $\phi(k,\omega)$ gives the variance of the spatiotemporal noise. This power spectral density describes the contribution to the variance of each temporal and spatial frequency component. FIGS. 2C-2D illustrate this power spectral density along $\omega$ and $k_x$ for $k_y=0$ (FIG. 2C) and $k_y=2\pi$ (FIG. 2D), respectively.

The foregoing analysis underscores an important capability: by spatial and temporal bandpass filtering, measurement noise can be reduced significantly. For example, measuring in the frequency range indicated by the rectangles A and B in FIGS. 2C-2D, gives an optical path length noise level of 0.11 nm and 0.07 nm, respectively. These remarkably low values are obtained for a spatial bandwidth of $\pi$ rad/µm (corresponding to 0.5 µm spatial distance) in both directions, and a temporal bandwidth of 1 rad/s, which are easily achievable in practice. Thus, path length changes of sub-angstrom scale can be measured by spatial and temporal filtering. It may also be noted that the spatiotemporal filtering is in essence an averaging procedure. Thus, the high acquisition rates of the methods described herein may be traded for increased sensitivity. The spatial and temporal sensitivities based on spatiotemporal filtering for wDPM are comparable with the values for SLIM (0.3 nm spatially and 0.03 nm temporally, as reported in Wang (2011).

EXAMPLES

Figure 3A:
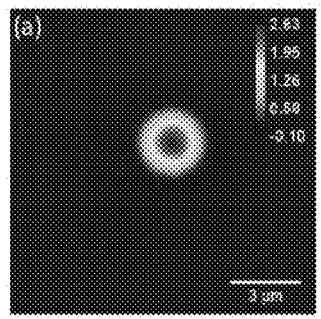

A polystyrene bead 300 of diameter 2.9±0.14 µm, immersed in immersion oil (Zeiss), was imaged using methods in accordance with the present invention, with a phase image shown in FIG. 3A. The measured phase value is 2.63 rad, which compares very well with the expected 2.59±0.12 rad at a central wavelength of the source of 550 nm. Use of a low condenser NA reduces the overall illumination power and, accordingly, the frame rate. However, using a sensitive camera, imaging at a frame rate of 10 frames/s has been achieved with a 40× objective. Furthermore, by using a source of higher brightness, this acquisition rate can be boosted by an order of magnitude.

Figure 3B:
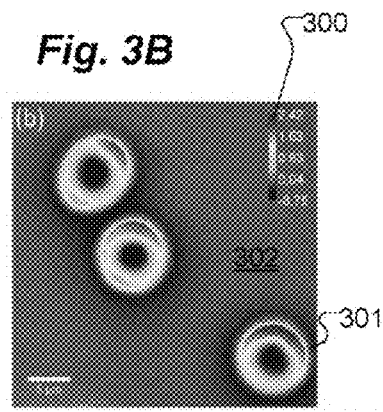
FIG. 3B shows live blood cells imaged in the same manner.

In a further example, live red blood cells (RBC) were imaged. Prior to imaging, the whole blood was diluted with Coulter LH series diluent (Beckman-Coulter) to a concentration of 0.2% whole blood in solution. FIG. 3B shows a quantitative phase image of live blood cells, where the normal, discocyte shape can be observed, the color bar shows the phase values in radians. The phase background outside the RBC is markedly more uniform than in the case of laser illumination.

The wDPM technique may also be advantageously employed for quantitative measurement of the dry mass, or nonaqueous content, of a living cell. It is known that the refractive index of a cell exhibits a strong linear dependence on the total cell protein concentration, as taught, for example, by Barer, Interference Microscopy and Mass Determination, *Nature*, vol. 169, pp. 366-67 (1952), which is incorporated herein by reference. Concentration, such that the refractive index n obeys $$n(x,y) = n_0 + \eta(\lambda) C(x,y) \quad (4)$$

where $\eta(\lambda)$ is the refraction increment (in ml/g) and C is the concentration of dry protein in the solution (in g/ml).

Using the relationship in Eq. (4), the dry mass surface density $\rho$ of the cellular matter can be obtained from the measured phase map $\varphi$ as follows:

$$\rho(x, y) = \frac{\lambda}{2\pi\eta} \varphi(x, y), \quad (5)$$

where $\lambda$ is the center wavelength, and where $\eta$=0.2 ml/g, which corresponds to an average of values reported by Barer (1952). The total dry mass of a cell can then be found by integrating over the entire area of the isolated cell and can be used to quantify cell growth noninvasively.

Figure 3C:
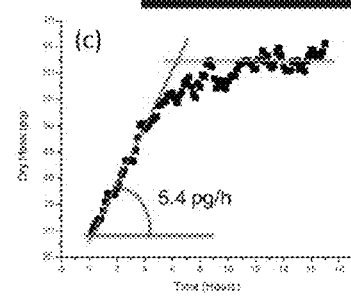
FIG. 3C shows a plot of the variation of dry mass with time for an isolated HeLa cell during its growth.
Figures 3D, 3E:
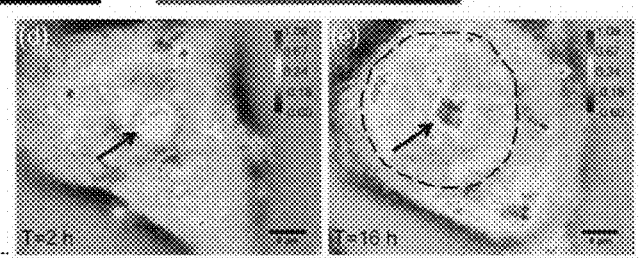
FIGS. 3D and 3E show time lapse quantitative phase images of a HeLa cell at T=2 hrs. and T=16 hrs., respectively.

In a yet further example, a human cervical epithelial cell line, HeLa cells, (ATCC, CCL-2) were imaged, thereby demonstrating the ability to quantify cell growth. The cells were plated onto a glass-bottom dish and allowed to settle for 24 hours before imaging. The dish was kept at 37° C. Time-lapse wDPM images were acquired once every 10 minutes for 18 hours. The exposure time was 200 ms for each image, with a tungsten lamp at 3,200 K, and the transmission shutter was closed before and after each scan. The dish was covered with a cover glass to reduce the effects of evaporation. FIG. 3B shows the variation of total dry mass in picogram (pg) with time in hours, clearly revealing cell growth. The particular cell shown appears to be growing at a fast rate of 5.4 pg/h for the first 6 hours, after which the growth slows and finally saturates slightly above the double mass level. Higher fluctuations in dry mass at later time points (t>6 hrs) is due to cell fragments and debris floating in the culture medium, which added noise to the measurement. FIGS. 3C-3D show quantitative phase images of the same cell at T=2 hours and T=16 hours, respectively, which reveals the cell structure (nucleolus is indicated by arrow and nucleus is indicated by dash circle).

Figure 4A:
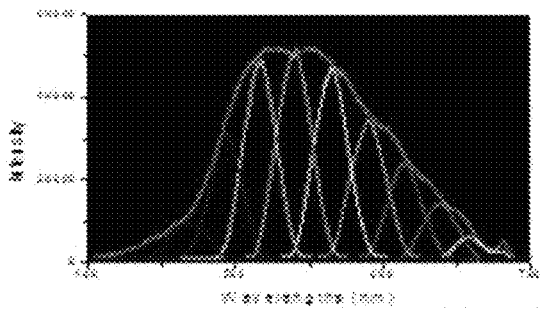
FIG. 4A shows the spectrum of the first order diffraction.
Figure 4B:
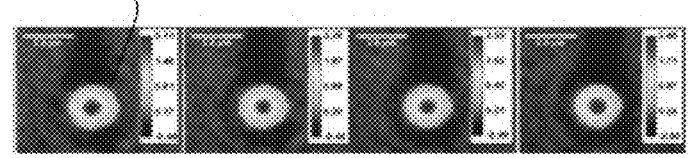
FIG. 4B shows the reconstructed phase maps of the 2.9±0.14 μm polystyrene bead at four different wavelengths (565 nm, 589 nm, 613 nm and 640 nm).
Figure 4C:
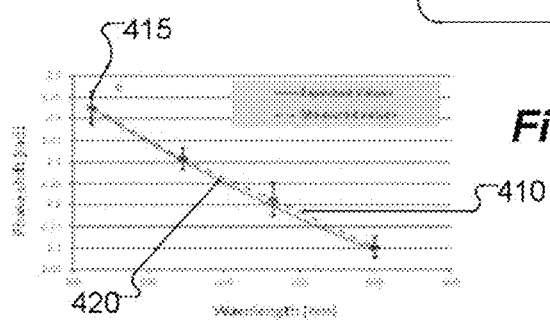
FIG. 4C shows the average phase value (dashed curve) for ten polystyrene beads with the error bar indicating standard deviation error.

Several polystyrene beads of diameter 2.9±0.14 µm immersed in Zeiss immersion oil were imaged using sDPM. FIG. 4B shows the reconstructed phase maps of the polystyrene bead at four different wavelengths (565 nm, 589 nm, 613 nm and 640 nm). FIG. 4E shows the average phase values (dashed curve 410) for ten polystyrene beads with the error bar indicating standard deviation error. The expected phase shift is shown by solid curve 420.

Figure 4D:
FIG. 4D present phase maps of an RBC at the same four different wavelengths.
Figure 4E:
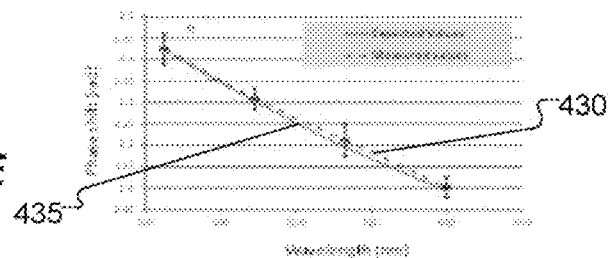
FIG. 4E shows the dispersion curve associated with these measurements.

By measuring the phase shifts at two different wavelengths using sDPM, from Eqs. 1 and 4, hemoglobin concentration C(x,y) and cell thickness h(x,y) of red blood cells may be calculated FIG. 4D present phase maps of an RBC at four different wavelengths (565 nm, 589 nm, 613 nm and 640 nm). The phase maps were then thresholded to segment RBCs and the phase shift for each cell was averaged over the cell. FIG. 4E shows the dispersion curve 430 associated with these measurements. The expected phase shift values (solid curve 435) were calculated for a 2 µm thick RBC.

Derivative Method for Phase Retrieval

In accordance with another aspect of the present invention, a technique for reconstruction of the quantitative phase is described, that may be applied advantageously in the context of white light diffraction phase microscopy or of any off-axis interferogram. The technique described herein is considerably faster than integral operator techniques such as those employing Hilbert or Fourier transforms, and is further described in Bhaduri et al., Derivative method for phase retrieval in off-axis quantitative phase imaging, *Opt. Lett.*, vol. 37, pp. 1868-70 (2012), which is incorporated herein by reference.

In off-axis QPI, the interference pattern can be written as $$I(x,y) = I_b(x,y) + \gamma(x,y) \cos[\phi(x,y) + kx] \quad (6)$$

as derived in full generality in Popescu, Quantitative phase imaging of cells and tissues, (McGraw-Hill, 2011), which is incorporated herein by reference. In the foregoing expression, $I_b$ is the background intensity, $\gamma$ is the modulation factor, $\phi$ is the phase delay due to the specimen, and k is the spatial frequency of the carrier fringes. The latter is determined by the tilt angle $\theta$ between the sample and reference beams, according to $k = 2\pi \sin \theta / \lambda$, where $\lambda$ is the wavelength.

In accordance with embodiments of the present invention, $\phi$, for phase objects, can be obtained via transverse derivatives of the interferogram, as now described. The first order derivative of Eq. 6 with respect to x can be written as $$\frac{\partial I(x,y)}{\partial x} = \frac{\partial I_b(x,y)}{\partial x} + \cos[\phi(x,y)+kx]\frac{\partial \gamma(x,y)}{\partial x} - \gamma(x,y)\sin[\phi(x,y)]\left[\frac{\partial \phi(x,y)}{\partial x}+k\right]. \quad (7)$$

For most transparent specimen of interest, i.e., phase objects, the following approximations may be made:

$$\frac{\partial I_b}{\partial x} \approx 0; \frac{\partial \gamma}{\partial x} \approx 0; \frac{\partial \phi}{\partial x} \ll k, \quad (8)$$

which is to say that the background intensity $I_b$ and modulation factor $\gamma$ are considered to be constant over the interferogram and the phase $\phi$ is considered to be is a "slowly" varying function (on the scale of the fringe period). The first two conditions are clearly fulfilled for phase objects, where no intensity modulation is observed. The third assumption applies by virtue of adjusting the fringe period to be smaller than the diffraction spot of the imaging system, such that the optical resolution is not degraded by sampling. Under these circumstances, over a diffraction spot (or central portion of the point spread function), the phase of the field $\phi(x,y)$ varies insignificantly, but the phase of the fringe kx changes by at least $2\pi$. The approximations of Eq. 8 allow for a simplification of Eq. 3:

$$I' = -\frac{\partial I(x,y)}{\partial x} = \gamma k \sin[n\phi(x,y)+kx]. \quad (9)$$

Similarly, the derivative of Eq. 9 with respect to x yields the following second-order derivative:

$$I'' = -\frac{\partial^2 I(x,y)}{\partial x^2} = \gamma k^2 \cos[\phi(x,y)+kx] \quad (10)$$

As the phase appears as the argument of the quadrature terms of the first- and second-order derivatives, it can be extracted, simply, as $$\phi(x,y) = \tan^{-1}\left[\frac{kI'}{I''}\right] - kx, \quad (11)$$

with the $\tan^{-1}$ calculated over 4 quadrants, or any equivalent form. The spatial frequency k, determined by the period of grating 120, has a fixed value over time, and throughout the field of view, and need only be measured once for a particular system. It may be measured, for example, by detecting the peak position of the first order of the Fourier transform of the interferogram. Since the derivative method described above is based on local operations, it is substantially faster than traditional integral operations; indeed, the derivative calculations may be parallelized, and performed extremely fast.

EXAMPLE

Figure 5A:
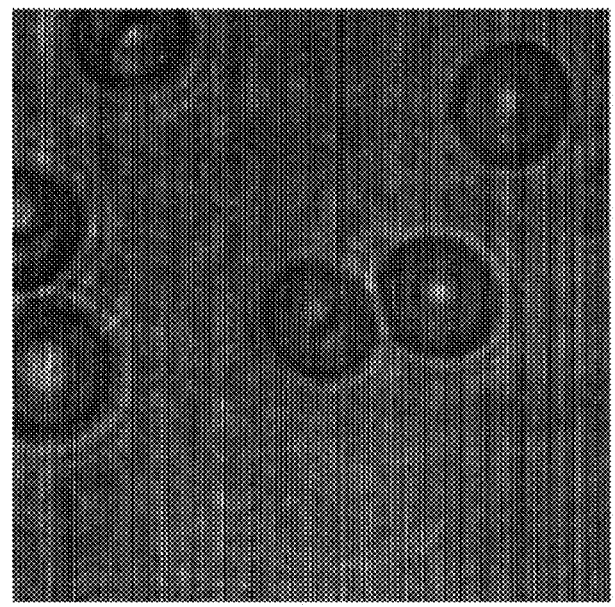
FIGS. 5A and 5B show the results of a derivative method for phase calculation applied in accordance with an embodiment of the present invention.
Figure 5B:
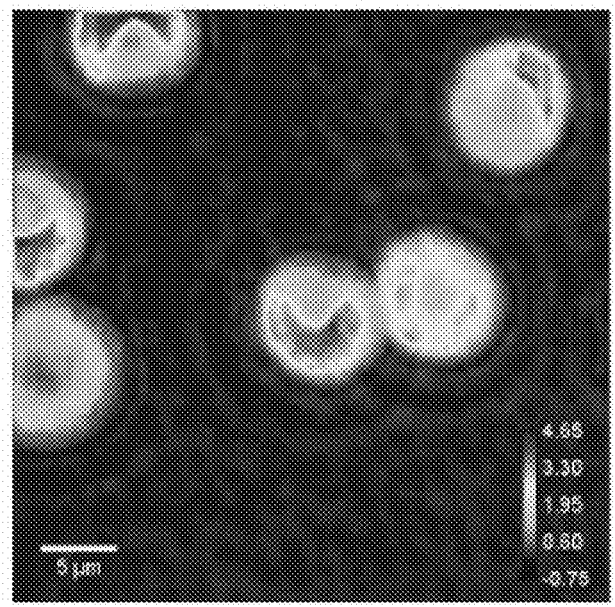
Figure 6A:
Figure 6B:
FIG. 6B shows the same scene under incoherent Diffraction Phase Microscopy.

In order to show the effectiveness of the derivative method for phase calculation, red blood cells were imaged using wDPM. in accordance with an embodiment of the present invention. FIG. 5A shows an original wDPM image of red blood cells, while FIG. 5B shows a reconstructed quantitative phase map after application of the algorithm described above with reference to Eqs. (6)-(11), subtracting the background phase. Color bars show the phase in radians, k=1.8285 rad/pixel.

In preferred embodiments of the present invention, the disclosed methods for quantitative phase imaging of transparent structures using white light diffraction phase microscopy may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

What is claimed is:
1. A diffraction phase microscope comprising:
 a. a temporally incoherent source of an illuminating beam for illuminating a specimen;
 b. an objective lens for collecting light from the source transmitted through the specimen and forming an image at an output port;
 c. a grating for relaying a zeroth order beam and for diffracting the image into a first-order diffracted beam;
 d. a first Fourier lens for transforming the zeroth-order beam and first-order diffracted beam into respective Fourier transform fields in a Fourier transform plane;
 e. a Fourier transform space mask for low-pass filtering one of the zeroth-order beam and the first-order beam in the Fourier transform plane; and
 f. a second Fourier lens for recombining the zeroth-order beam and first-order diffracted beam at a focal plane detector.

2. A diffraction phase microscope in accordance with claim 1, further comprising a condenser aperture disposed between the temporally incoherent source and the specimen for creating a substantially spatially coherent illumination beam in a sample plane.

3. A diffraction phase microscope in accordance with claim 1, wherein the Fourier transform space mask is implemented by a spatial light modulator.

4. A diffraction phase microscope in accordance with claim 1, wherein the grating is a transmission grating.

5. A diffraction phase microscope in accordance with any of claims 1-4, wherein the Fourier transform space mask includes a pinhole for transmitting the zeroth-order beam as a reference beam.

6. A diffraction phase microscope in accordance with any of claims 1-4, wherein the Fourier transform space mask includes a plurality of pinholes for transmitting the first-order beam as a reference beam specific to a spectral range.

7. A method for obtaining a phase image of a substantially transparent specimen, the method comprising:
   a. illuminating the specimen with substantially temporally incoherent light;
   b. forming a transmission image of the specimen in an image plane;
   c. dispersing the transmission image with a grating into zeroth and first order beams;
   d. low-pass filtering one of the zeroth-order and the first-order beam with a Fourier transform space mask in a Fourier plane of a Fourier lens;
   e. interfering the zeroth- and first-order beams at a focal plane detector; and
   f. retrieving a spatially resolved quantitative phase image of the specimen.

8. A method in accordance with claim 7, wherein the first-order beam is filtered by means of a plurality of pinholes for selecting a reference beam at wavelengths characterizing a specified spectral range.

9. A method in accordance with claim 7, wherein retrieving a spatially resolved quantitative phase image is performed by applying a spatial Hilbert transform.

10. A method in accordance with claim 7, wherein retrieving a spatially resolved quantitative phase image is performed by applying local derivatives of an interferogram obtained at the focal plane detector.

11. A method in accordance with claim 7, wherein forming the transmission image includes illuminating the phase object with substantially spatially coherent illumination.

12. A method in accordance with claim 7, where the illumination is substantially incoherent.

* * * * *